July 14, 1936.   N. M. BARKER   2,047,402
MOMENTUM MEASURING APPARATUS FOR GOLF PRACTICE AND THE LIKE
Filed July 12, 1933   7 Sheets-Sheet 1

INVENTOR
BY *N. M. Barker*
ATTORNEYS

July 14, 1936.　　　　N. M. BARKER　　　　2,047,402
MOMENTUM MEASURING APPARATUS FOR GOLF PRACTICE AND THE LIKE
Filed July 12, 1933　　　7 Sheets-Sheet 3

INVENTOR
N. M. Barker
BY
ATTORNEYS

July 14, 1936.  N. M. BARKER  2,047,402
MOMENTUM MEASURING APPARATUS FOR GOLF PRACTICE AND THE LIKE
Filed July 12, 1933  7 Sheets-Sheet 6

Fig. 8

INVENTOR
N.M.Barker
BY
ATTORNEYS

Fig. 9

Patented July 14, 1936

2,047,402

UNITED STATES PATENT OFFICE 2,047,402

MOMENTUM MEASURING APPARATUS FOR GOLF PRACTICE AND THE LIKE

Norman M. Barker, Wadsworth, Ohio

Application July 12, 1933, Serial No. 680,054

12 Claims. (Cl. 265—20)

My invention relates generally to momentum measuring and indicating apparatus for successively measuring successive momentums imparted to a body, such as the simulation of a standard golf ball, constrained for movement in a restricted path, each momentum being imparted to the body by the impulse of a force acting on the body, such as the striking force of a golf club, and the apparatus preferably indicating each momentum in terms of the horizontal distance of free flight which would have been imparted to a freely movable body, such as a standard golf ball, when subject to the impulse imparting the indicated momentum.

More particularly, my invention relates to apparatus for golf practice including a body simulating a standard golf ball and which may be called a practice ball and which is constrained for movement in a restricted path, and momentum measuring and indicating means operatively associated with the practice ball for successively measuring and indicating each of a succession of momentums imparted to the practice ball by the impulses or strokes of a golf club used for practicing in the ordinary manner by a player, and the operation of the appartus being controlled when desired by coin, check, or token controlled operation control means.

The types of momentum measuring and indicating apparatuses heretofore proposed, including those primarily intended to be used for golf practice, have been inaccurate, have been difficult to operate and use, and have had other disadvantages, with the result that very few if any such apparatuses are generally available and in use for any purpose, and particularly for the purpose of golf practice.

From another standpoint, there are no generally available apparatuses or machines having coin, check, or token controlled operation control means permitting a definite plurality of externally actuated operations of the apparatus or machine after each insertion and functioning of a coin, check, or token in the operation control means of the apparatus.

The objects of the present invention are in general to provide an improved momentum and indicating apparatus particularly adapted for use for golf practice, and to provide such an apparatus operatively associated when desired with coin, check, or token controlled operation control means permitting a definite plurality of momentum measuring and indicating operations of the apparatus after each insertion and functioning of a coin, check, or token in the operation control means of the apparatus.

More specific objects of the present invention, and the nature of some of the means for their attainment, are as follows:

First, to provide a practice apparatus for increasing the efficiency of a player in striking with a golf club so that in actual play, the player may drive the golf ball a maximum distance and in a controlled and desired direction, the practice apparatus including a body or practice ball constituting a simulation of a standard golf ball and constrained for movement in a restricted path, momentum measuring and indicating means operatively associated with the practice ball for indicating accurately preferably in yards the distance of flight which would have resulted from striking an unrestrained standard golf ball in the same manner as the practice ball of the apparatus is struck by various strokes of the player, and the practice ball being arranged so that after each stroke applied thereto there is indicated to the player or driver or others after the completion of each stroke in just what manner the practice ball has been struck, so that the result of a sliced, hooked, or topped ball stroke may be compared with the result of a properly executed stroke;

Second, to provide practice apparatus of the above character and which is so constructed and arranged that it may be located within a building or out of doors in a relatively small area and arranged so that repeated strokes may be applied to the practice ball thereof and so that the practice ball may be returned to a striking position after each stroke is applied thereto, preferably by depressing a foot pedal, whereby when the practice ball is returned to the striking position the character of the previous stroke is made apparent and the practice ball is positioned for another stroke, thus making it possible to improve the player's golf stroke at home, at a club, at a recreation resort, or at any other place, where the practice apparatus may be located;

Third, to provide golf practice apparatus that will tend to foster the habit of keeping the player's head down and the player's eyes on the ball when striking the ball instead of jerking it up to follow the flight of the ball, the latter habit being generally accepted to be the cause of most improper golf strokes, and for this purpose, the indicator of the apparatus is located in such position that the player or driver looks in the same direction to observe the result of his strokes as the player looks in addressing the practice ball of the apparatus;

Fourth, to provide an apparatus as aforesaid in which the indicator is arranged to hold the vision of the player or driver as long as possible in the proper line thus tending to break the habit of raising the head to follow the flight of the ball, and for this purpose, the apparatus includes means for indicating at a gradually decreasing rate of speed on the indicator, the distance an unrestrained ball would have been driven by the applied stroke, so that the time elapsing between the instant of striking the practice ball of the apparatus, and the final indication of distance is comparable to the time elapsed during the actual flight of an unrestrained golf ball if struck by the same stroke;

Fifth, to provide practice apparatus of the foregoing description and which is adapted for use by an instructor in teaching a student the art of properly striking a golf ball, such instruction being possible by the use of the improved apparatus with any degree of privacy desired, and without the necessity of requiring driving ranges, caddies, or the like;

Sixth, to provide practice apparatus of the foregoing description, and the use or operation of which is controlled by coin, check, or token controlled operation control means, so that the use or operation of the practice apparatus is possible only after the insertion and functioning of a coin, check, or token in the operation control means, and accordingly a charge may be made for the use of the apparatus when an attendant is not present, whereby the apparatus may be installed for use in athletic clubs, recreation resorts, golf clubs, near the first tee on golf courses, or at other desirable locations;

Seventh, to provide apparatus having a coin, check, or token controlled operation control means constructed and arranged so that a desired predetermined number or plurality of externally actuated operations of the apparatus may be permitted after the insertion and functioning of each single coin, check, or token in the operation control means without requiring further manipulation by the user of the operation control means of the apparatus until after the predetermined number of externally actuated operations of the apparatus has been carried out. Preferably, in the case of such a golf practice apparatus, the apparatus is arranged so that the player may proceed with the acts of striking the practice ball repeatedly a predetermined number of times after the insertion and functioning of a coin, check, or token in the operation control means of the apparatus without further manipulation thereof by the player, the practice ball being returned to a striking position after each stroke preferably by release means actuated by a foot of the player, whereby returning the practice ball to striking position does not require removal of the hands of the player from the club, and whereby the operation of the release means interferes very slightly with the timing of the stroke and the stance of the player.

These and other objects are attained by the parts, improvements, arrangements, combinations, sub-combinations, and apparatus comprising the present invention, which are particularly described and shown in the accompanying specification and drawings, and which are distinctly pointed out and set forth in the appended claims.

In general terms the present invention may be stated as including a frame, a practice ball body mounted in the frame for constrained movement in a restricted path and adapted for being struck by a player, releasable shock absorbing and anti-recoil means mounted in the frame for absorbing the shock of the impact of the ball body and for holding the same after it has been moved by impact a predetermined distance, momentum measuring and indicating means operatively associated with said ball body, cam and lever means operatively associated with said shock absorbing and holding or anti-recoil means for releasing said ball body and returning it to normal or striking position, means for locking said release means for maintaining said ball body in partially returned position after a predetermined number of impacts, and coin controlled operation control means for unlocking said locking means for permitting another series of impact movements of said ball body.

Referring to the accompanying drawings forming part hereof.

Similar numerals refer to similar parts throughout the drawings.

The improved apparatus for golf practice and the like is indicated generally at 10 and includes walls and members forming a frame indicated generally at 11, and the frame 11 operatively mounts a body 12 which as illustrated and for the purpose of a golf practice apparatus is a simulation of a standard golf ball and which is sometimes hereinafter termed a practice ball.

The practice ball 12 is constrained for movement only in a restricted path, which in the illustrated embodiment of the invention is a curved path about a horizontal axis, and the practice ball 12 is adapted for having successive momentums imparted thereto by successive impulses of forces acting on the practice ball, which in the normal use of the apparatus for golf practice are successive striking forces or impacts of a golf club used in the normal manner by a player, instructor, or other user of the apparatus.

The practice ball 12 is operatively associated by novel momentum measuring means indicated generally by 13, and hereinafter set forth in greater detail, with indicator means indicated generally by 14, whereby each momentum imparted to the practice ball 12 is accurately measured and visibly indicated by the indicator means 14.

The operation of the apparatus 10 is preferably controlled by novel and improved coin, check, or token controlled operation control means indicated generally by 15, and which are hereinafter set forth in greater detail.

In the illustrated embodiment of the apparatus, some of the walls of the frame 11 preferably form a box-like case having an upwardly opening interior compartment 16 and being provided with a cover 17 which is removably secured upon the upper ends of the case walls, as by means of cap screws 18.

When the apparatus 10 is installed for use the top surface of the cover 17 is located in substantially the same horizontal plane as that upon which the player or user stands.

In the frame 11 are journalled a shaft 19 for the momentum measuring means 13, a practice ball release and resetting shaft 20, and a lock and release shaft 21 for the operation control means 15; the three shafts 19, 20, and 21 extending longitudinally within the compartment 16 and preferably being parallel with each other and being located as illustrated in three successive levels with the shaft 19 uppermost.

An indicator drive shaft 22 for the indicator means 14 is also journalled in the frame 11 and is located within the compartment as illustrated above the uppermost shaft 19, and the indicator drive shaft 22 extends as illustrated at right angles with the three parallel shafts 19, 20, and 21.

The cover 17 is provided with an indicator dial reading opening 23 preferably covered with a plate of glass 24, release plunger slide bearing 25, and a practice ball and drive arm slot 26.

A mat 27, of rubber or other resilient material, and having a slot 28 formed therein, is preferably located upon a portion of the top face of the cover 17 of the apparatus at one end 29 thereof which may be termed the striking end from the fact of the location at the end 29 of the apparatus of the practice ball 12 and its immediately associated parts, and the mat slot 28 registers with the cover slot 26, whereby the mat 28 serves to prevent or minimize damage to the head of a club being used for practice in the event that the club head misses or slices off the practice ball and strikes against the striking end portion of the cover 17 thus provided with the protective resilient mat 27.

Figure 1:
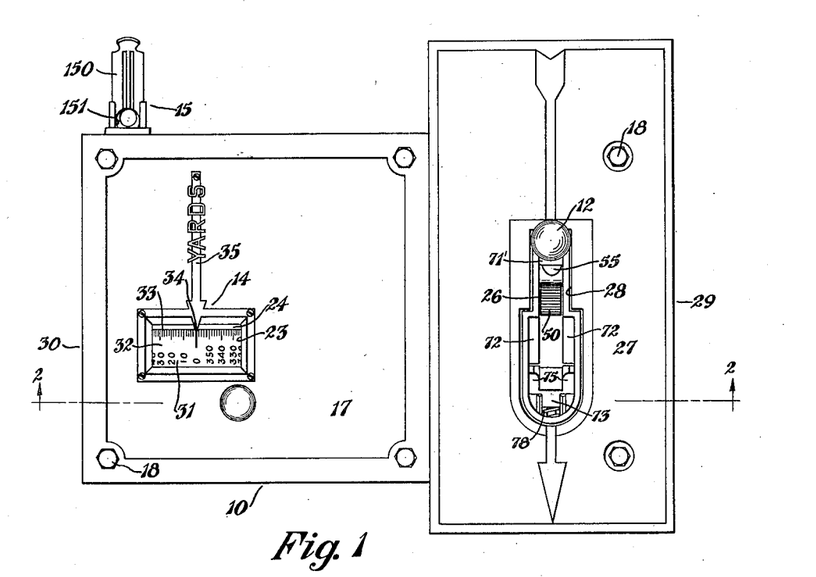
Figure 1 is a plan view of the improved apparatus, showing the ball body in striking position and the momentum measuring dial at zero.
Figure 2:
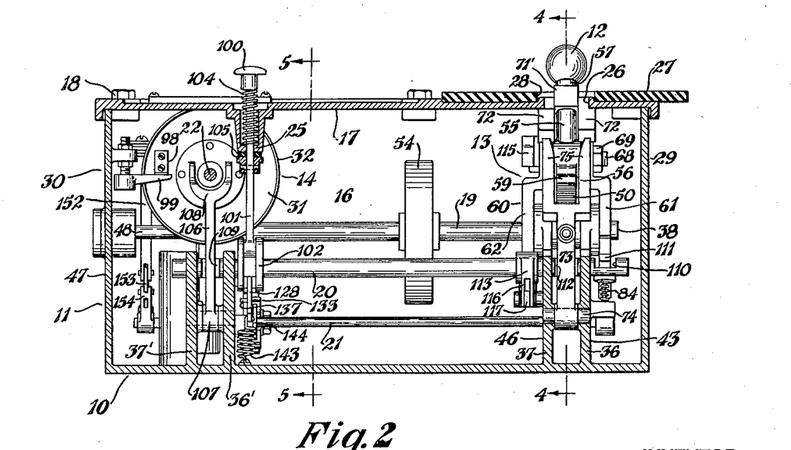
Fig. 2 is a sectional view, as on line 2—2, Figs. 1 and 3.

The other end 30 of the apparatus may be termed the indicating end from the fact that the indicator means 14 is located adjacent the end 30 of the apparatus, and the indicating means 14 includes an indicator drum dial 31 which is operatively mounted on the indicator drive shaft 22 and which includes a cylindric dial rim 32 which is located immediately below the dial reading opening 23 of the cover 17, and the dial rim 32 is provided on its external cylindrical face with calibrated indicator markings 33 which are read with respect to the point 34 of the head of an indicator reading arrow 35 which is formed, painted, or otherwise provided on the top of the indicator end of the cover 17, as best illustrated in Fig. 1.

The frame 11 at the striking end 29 thereof includes, as illustrated within the compartment 16, two cross members 36 and 37 which extend crosswise with respect to the shafts 19, 20, and 21, and which are preferably parallel with each other as illustrated, and are spaced from each other longitudinally with respect to the longitudinal axes of the shafts 19, 20, and 21.

The end portion 38 of the shaft 19 adjacent the striking end 29 of the apparatus, extends preferably through bushing apertures provided in the cross members 36 and 37, and is journal supported in the cross members 36 and 37, preferably by means of bearing bushings 39 and 40.

Figure 4A:
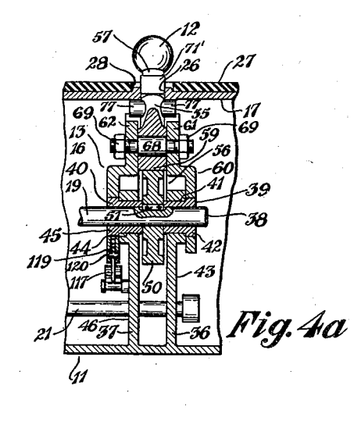
Fig. 4a is a fragmentary sectional view substantially on line 4a—4a, Fig. 4.

As best shown in Fig. 4a, the bearing bushings 39 and 40 are provided with alined bores each journalling a length of the end portion 38 of the shaft 19, and the bushing 39 is provided with one preferably externally cylindrical end 41 which is force fitted in the bushing aperture of the cross member 36, and the bushing 39 has another preferably externally cylindrical end 42 which extends beyond the striking end side 43 of the cross member 36; and similarly the bushing 40 has one preferably cylindrical end 44 which is force fitted in the bushing aperture of the cross member 37, and the bushing 40 has another preferably externally cylindrical end 45 which extends beyond the indicator end side 46 of the cross member 37.

The frame 11 includes as illustrated an end wall 47 at the indicator end 30 of the apparatus, and the other end portion 48 of the shaft 19 is journal supported in the frame end wall 47 preferably in the bore of a bushing 49 which is force fitted in a suitable socket formed in the end wall 47.

The longitudinal axes of the bores of the bushings 39, 40, and 49 are all accurately alined with each other, whereby a three bearing support is provided for the shaft 19 permitting rotation of the same with substantially no friction.

Between the cross members 36 and 37 a clutch wheel 50 is secured on the end portion 38 of the shaft 19 as by the illustrated key means 51.

Between the cross member 37 and the end wall 47 the shaft 19 has secured or formed thereon a worm 52, and the indicator drive shaft 22 has secured thereto a worm wheel 53 which meshes with the worm 52, whereby the indicator shaft 22 is rotated when the shaft 19 is rotated.

A fly wheel 54 may be as illustrated secured on the shaft 19 between the cross member 37 and the worm 52, or the clutch wheel 50 may be made of suitable size and form so as to effectively act as a fly wheel, so that a means is provided for storing the rotary energy imparted to the shaft 19 by operation of the apparatus, whereby the rotation of the shaft 19 continues over a desired period of time during each rotation thereof.

The practice ball 12 is constrained for movement only in a restricted path, and is operatively associated in a novel manner with the momentum measuring means 13, as aforesaid, and for this purpose in the illustrated embodiment of the invention, a drive arm 55 is operatively arranged for clutch or gripping engagement and disengagement with the clutch wheel 50, the wheel 50 and arm 55 constituting parts of novel clutch means indicated generally by 56, and the drive arm 55 extends outwardly from the clutch wheel 50 and shaft 19 and is alined for movement in and out of the practice ball and drive arm slot 26 of the cover 17, and the practice ball 12 is mounted on the outer end 57 of the drive arm 55.

The practice ball 12 is preferably made of rubber and preferably includes a T stem 58 (Fig. 4) extending from the bottom thereof and which is anchored in a fitting T-shaped opening formed in the drive arm 55, whereby the T stem of the practice ball 12 may be molded directly in the T-shaped opening formed in the drive arm 55.

As aforesaid, the improved clutch means 56 includes the clutch wheel 50 and the drive arm 55 and furthermore includes novel means operatively mounting the drive arm 55 for gripping engagement and disengagement of the inner end 59 thereof with the clutch wheel 50, and which include a rotatable frame or straddle yoke indicated generally at 60, and which as illustrated is formed by separable side members 61 and 62; and the side member 61 has a bearing aperture formed therein which journal supports the side member 61 beyond and clear of the striking end side 43 of the cross member 36 on the externally cylindrical end 42 of the bushing 39; and similarly the side member 62 has a bearing aperture formed therein which journal supports the side member 62 beyond and clear of the indicator end side 46 of the cross member 37 on the externally cylindrical end 45 of the bushing 40.

The side member 61 as illustrated includes at its outer periphery an arcuate counterweight flange 63 which extends laterally towards the side member 62, and the side member 62 as illustrated includes an arcuate counterweight flange 64 which extends laterally towards the side member 61 and thus towards the flange 63 thereof, and the opposite side faces of the flanges 63 and 64 abut each other as illustrated, and the side members 61 and 62 are secured to each other as by means of bolts 65 and nuts 66, the shank of each bolt extending through suitable registering apertures formed in the flanges 63 and 64 of the side members 61 and 62, and the opposite and laterally extending flanges 63 and 64 thus serve to space the remaining portions of the side members 61 and 62 from each other and from the cross members 36 and 37.

In other words, the rotatable frame or straddle yoke 60 thus formed by the side members 61 and 62 straddles the wheel 20 without contacting the same, and is journalled on the bushings 39 and 40 independently of the journalling of the shaft 19 therein.

The drive arm 55 mounting the practice ball 12 is independently journalled upon a fulcrum shaft 68 having its ends extending through and secured to side members 61 and 62, respectively, as by nuts 69.

The outer surface of the clutch wheel 50 is preferably grooved or serrated, and the lower inner end 59 of drive arm 55 is preferably curved or cam shaped and adapted for gripping engagement with the grooved or serrated outer surface of the clutch wheel 50, as shown in Figs. 2, 4, 6, 11 and 12.

Figures 3, 4, 5:
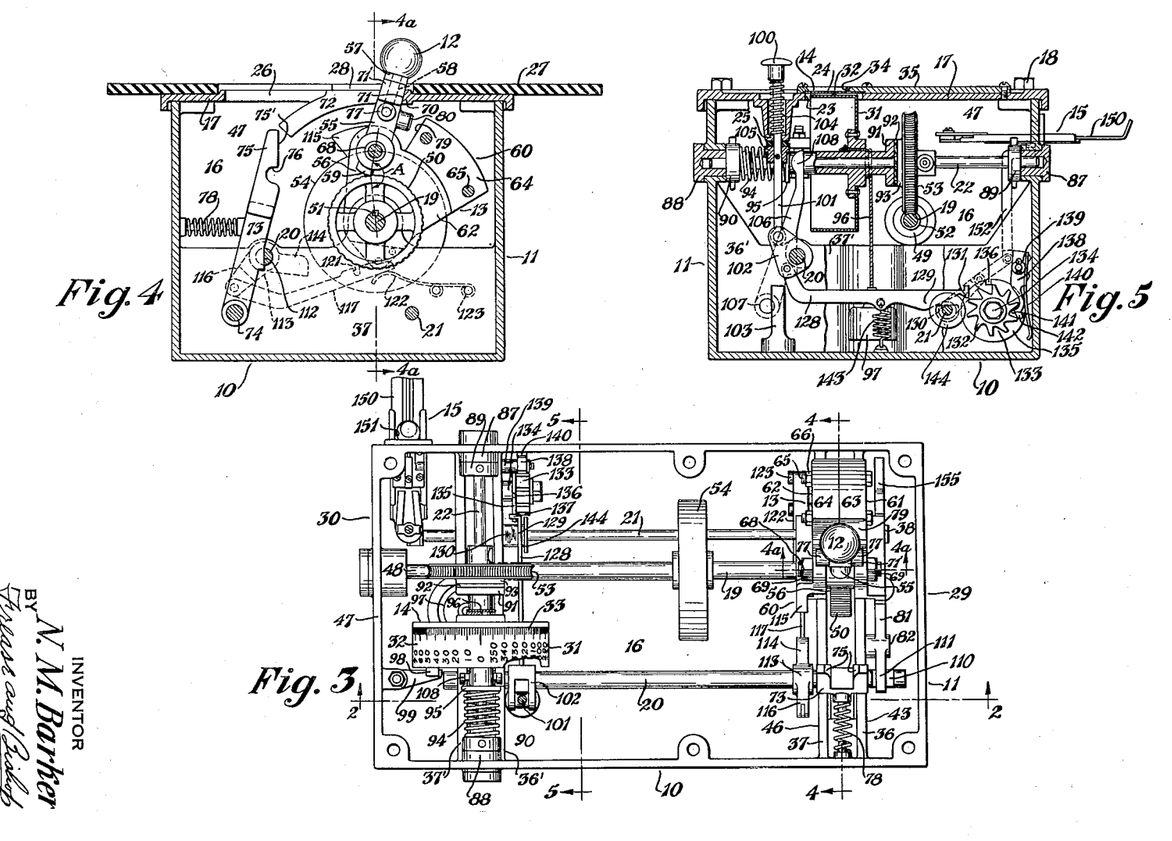
Fig. 3 is a plan view similar to Fig. 1, with the cover removed.
Fig. 4 is a transverse sectional view, substantially on line 4—4, Figs. 2 and 3, distant parts being removed.
Fig. 5 is a transverse sectional view as on line 5—5, Figs. 2 and 3.

Preferably, the parts are so proportioned that when the ball 12 is in normal or striking position, the fulcrum shaft 68 is directly above the shaft 19, and the driving arm 55 is inclined upwardly and to the right, as viewed in Fig. 4. That is, the axis of shaft 68 is spaced slightly to the left of a straight line drawn between the axis of shaft 19 and the center of ball 12.

With the drive arm 55 in this position, the end wall 70 of the arm slot 26 acts as a stop abutting the back stop surface 71 of the squared portion 71' of the arm 55, to prevent clockwise movement thereof. In this position, the arcuate counterweight flanges 63 and 64 exert a toggle action on the drive arm, tending to force the shaft 68 into a straight line between the axis of shaft 19 and the center of ball 12, thus holding the end 59 in gripping and driving engagement with the serrated surface of clutch wheel 50. Accordingly, counter-clockwise movement imparted to the ball 12 will impart counter-clockwise movement to drive arm 55, straddle yoke 60, and wheel 50, the squared portion 71' sliding in arcuate guides 72 on the cover 17, and all three parts moving substantially as a unit.

Preferably, the parts are so arranged and proportioned that when the ball 12 is in striking position (Fig. 4), the included angle A between a line drawn from the point of engagement of the end 59 of the drive arm to the axis of shaft 68, and a line drawn from said point of engagement to the axis of shaft 19, is not greater than 160°. With the parts in this relationship, when an impact is imparted to the ball to rotate it in a counter-clockwise direction, the frictional or gripping engagement between the end 59 and the wheel 50 is sufficient to rotate the wheel in a counter-clockwise direction without any slippage, even though the outer surface of the wheel and the cam surface of end 59 are both smooth and hardened.

It is to be noted that by reason of the gripping engagement of the drive arm 55 with the wheel 50 when the ball 12 is struck, the wheel 50 and the shaft 19 have imparted thereto the exact rotary speed about the axis of the shaft 19 as that which has been imparted to the ball 12 by the striking club.

When the ball 12 is given a sudden, forcible impact, as by striking it with a golf club, the momentum of these parts will cause them to rotate as a unit after contact between the club and ball 12 is broken.

Releasable shock absorbing and anti-recoil means for absorbing the shock of impact imparted to the driving arm 55 and for holding the arm after it has been moved a predetermined distance by said impact, preferably includes a bifurcated shock absorbing member 73 pivotally mounted at its lower end on the cross member 36 of the frame, as at 74.

The member 73 is provided at its upper end with arms 75, having notches 76 adapted to receive cylindrical studs 77 projecting from the sides of drive arm 55 between the fulcrum shaft 68 and the back stop surface 71. Between the notches 76 and their upper ends the arms 75 are provided with friction surfaces 75' for frictionally engaging the studs 77 as the driving arm is driven in a counter-clockwise direction.

A compression spring 78 is preferably interposed between member 73 and the frame for cushioning the shock of impact between the studs 77 and the arms 75, and gradually absorbing the momentum of the driving arm.

Thus when the drive arm 55 is driven counter-clockwise, the impact between studs 77 and friction surfaces 75' causes the driving arm to pivot about fulcrum shaft 68 a sufficient amount to move the end 59 of the arm from gripping engagement with the wheel 50. The counter-clockwise movement of the straddle yoke 60 is stopped by abutment of its end surface 79 with the stop 80 projecting from the rear surface of the drive arm and located at a point below the studs 77 so that the mass of the counterweight flanges of the yoke acts to maintain the end 59 of the drive arm in disengaged or non-gripping position with respect to the wheel 50, permitting the momentum of the wheel to continue to rotate it.

As the drive arm and yoke are brought to a positive stop, the yielding resistance of spring 78 gradually builds up the frictional resistance between the studs 77 and surfaces 75' until the studs 77 are received in notches 76, and the notches 76 are adapted to extend around the upper surfaces of studs 77 sufficiently to prevent recoil of the drive arm. Recoil of the yoke is prevented by a latch member 81 pivotally mounted at 82 on cross member 43, the end 83 of said latch member being urged upwardly by a spring 84 to engage a tooth 85 on the yoke 60, as shown in Fig. 7.

Figure 7:
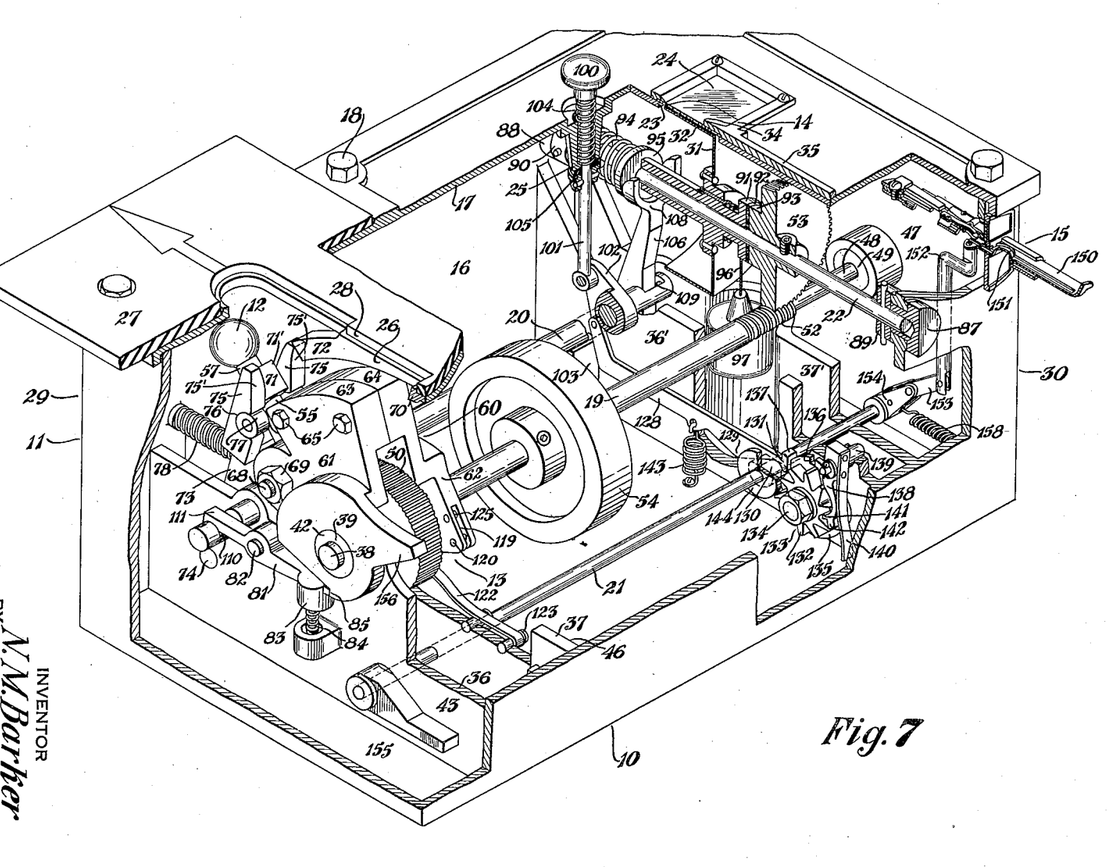
Fig. 7 is a similar perspective view showing the ball body held in impact-moved position after the first impact.
Figure 10:
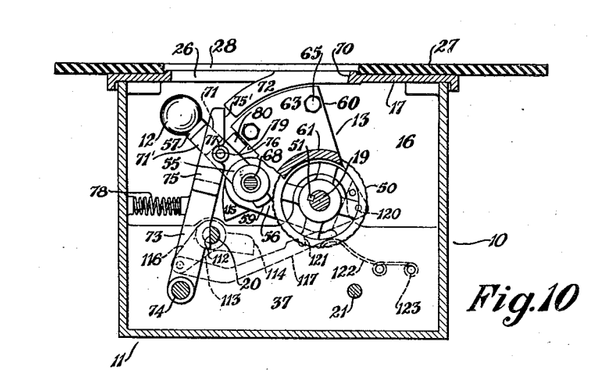
Fig. 10 is a transverse sectional view similar to Fig. 4, showing the ball body held by the shock absorbing means, after having been moved a predetermined distance by impact.

With the arm 55 and yoke 60 thus locked in the positions shown in Figs. 7 and 10, force exerted through the yoke toward the shaft 19 by the compression of spring 78 is taken care of by the independent journalling of the yoke on the shaft journalling bushings 39 and 40, so that the shaft 19 rotates freely.

The momentum thus imparted to the shaft 19 and fly wheel 54 is directly proportionate to the speed, weight and direction of movement of the club head, and is transmitted through the worm 52 on the shaft 19 to the worm wheel 53 fixed on the indicator shaft 22.

The shaft 22 is journalled at its ends in suitable bearings 87 and 88 mounted in the frame 11, and collars 89 and 90 are secured on the shaft adjacent the bearings 87 and 88 for preventing endwise movement of the shaft.

The indicator drum 31 is operatively mounted on the shaft 22 adjacent to the worm wheel 53, and is provided with a hub flange 91 the face of which is preferably covered with friction material 92 for frictionally engaging the face of the hub 93 of the worm wheel.

Means for normally holding the drum 31 in driving engagement with the worm wheel 53 preferably includes a compression spring 94 interposed between collar 90 and a collar 95 slidably mounted on the shaft 22 and abutting the hub of drum 31 for urging said drum towards worm wheel 53.

Preferably, a flexible cable or cord 96 is fixed at one end to the drum 31 and passes around the spool-like portion of the hub between the drum and the hub flange 91. The other end of the cord 96 is attached to a weight 97. With the point 34 of the indicator arrow 35 pointing to zero on the drum 31, as shown in Fig. 1, the weight 97 will be at its lowest position.

The mass of weight 97 provides a constant calculatable force resisting rotation of the drum 31 in a clockwise direction (as viewed in Fig. 2) to indicate movement on the dial rim 32 from zero to a greater number. As the cord 96 winds up on the hub of the drum the work done in raising the weight absorbs or dissipates the momentum transmitted to the various members through shafts 19 and 22.

When the weight has reached the upper limit of its movement, the engagement between worm wheel 53 and worm 52 will maintain it in that position, and the dial rim will show the corresponding reading until the parts are released in a manner to be hereinafter described. When the hub of the drum 31 is disengaged from frictional engagement with the hub of worm wheel 53, the weight 97 will rotate the drum in a counter-clockwise direction until the stop 98 on the drum abuts the stop arm 99 (Fig. 2) adjustably mounted on the frame to cause the dial to read zero.

Great accuracy of calibration may be attained by adjusting the mass of weight 97 in relation to the diameter of the spool-like portion of the hub of the drum 31.

Thus, the dial rim 32 may be calibrated to accurately measure the momentum imparted to the practice ball 12 by striking it with a golf club so as to indicate the number of yards a golf ball would have been driven by the same blow directed in the same manner.

The cam and lever means operatively associated with the shock absorbing and holding means, for releasing the ball 12 and resetting it or returning it to normal position, preferably includes the release and resetting shaft 20, which is parallel with shafts 19 and 21, as previously set forth.

The shaft 20 is preferably journalled at one end portion in the cross members 36 and 37, and at its other end portion in similar cross members 36' and 37' located adjacent the indicator end of the frame. Means for causing a partial rotation of shaft 20 in a counter-clockwise direction, as viewed in Fig. 5, preferably includes the release pedal 100 mounted on the top end of the release plunger rod 101 and located above the cover 17.

The rod 101 extends through the release plunger slide bearing 25, and the rod is pivotally connected at its lower end to the outer end of a crank member 102 secured to the shaft 20 adjacent the cross member 36'. A stop 103 (Fig. 5) is provided on the bottom wall of the frame for abutting the crank member 102 to limit the downward movement of the release pedal 100.

A spring 104 is interposed between the pedal 100 and the slide bearing 25, for returning the pedal to its upper position when released. A collar 105, fixed on the plunger rod 101, abuts the bottom surface of slide bearing 25 for limiting the upward movement of the pedal 100.

Means for releasing driving engagement between drum 31 and worm wheel 53 for returning the drum to zero when the pedal 100 is depressed, preferably includes the drum release lever 106 pivotally mounted at its lower end on the cross members 36' and 37', as at 107, and located therebetween.

The lever 106 is provided at its upper end with a forked portion 108 for engaging the collar 95 at opposite sides of the hub of drum 31. The lever 106 is positioned in such a way that an intermediate portion thereof fits in a cam notch 109 in shaft 20 and the weight of the upper end portion of the lever normally holds the forked portion 108 out of engagement with collar 95. When the pedal is depressed, the shaft 20 rotates to bring the surface of the shaft at the edge of notch 109 against the lever 106, and the forked portion 108 forces the collar away from drum 31 against the action of spring 94. This frees the drum and the weight rotates it back to zero in the manner previously described.

At the driving end 29 of the apparatus, the end of shaft 20 extends beyond the face 43 of the cross member 36, and is provided with a cam notch 110 for normally receiving the end 111 of latch member 81.

Between the cross members 36 and 37, the shaft 20 is provided with another cam notch 112, for normally receiving an intermediate portion of the shock absorbing member 73, as best shown in Fig. 4.

Figure 11:
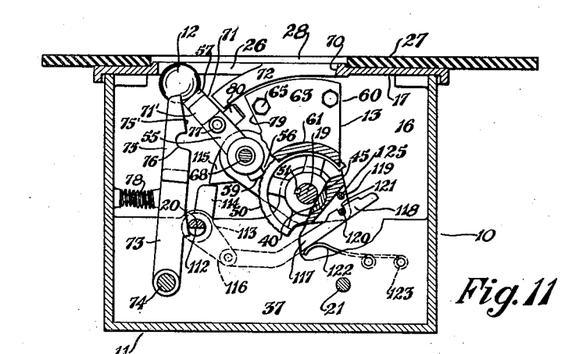
Fig. 11 is a similar view showing the ball body released from the shock absorbing and holding means, and in the initial stage of its return movement.

Adjacent the face 46 of cross member 37 a yoke returning or resetting crank member 113 is secured on the shaft 20. The crank member 113 is preferably provided with a cam arm 114 adapted for engaging the cam portion 115 on the side member 62 of the straddle yoke 60, as shown in Fig. 11.

Figure 12:
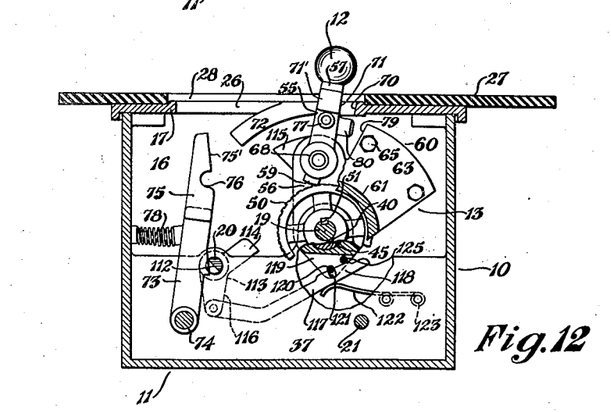
Fig. 12 is a similar view showing the ball body at a later stage of its return movement just prior to reaching normal position, and showing the returning means being disconnected therefrom.

A crank arm 116 is preferably provided on crank member 113, and a yoke resetting or returning link 117 is pivotally connected at one end to the crank arm 116. The other end of link 117 is provided with a widened portion 118, slidably inserted in a slot 119 in the lower portion of the side member 62, as shown in Figs. 11, 12 and 4a.

The walls of the slot 119 preferably have a pin 120 secured therein, and the portion 118 is provided with a notch 121. A spring 122, secured at one end to cross member 37, as at 123, forces the portion 118 of the link upward for engaging the pin 120 in the notch 121, as shown in Fig. 11.

After an impact movement of the ball 12, with the parts in the positions shown in Figs. 7 and 10, when the release pedal is depressed, rotating the shaft 20, the end 111 of latch member rides out of the cam notch 110 releasing latch member 81 from engagement with tooth 85 and releasing the straddle yoke 60.

At the same time, the shock absorbing member 73 rides out of cam notch 112, forcing member 73 to the left, as viewed in Fig. 11, and releasing the studs 77 from the notches 76. The initial rotation of the shaft 20 by depression of the pedal 100 brings the cam arm 114 into abutment with the cam portion 115 of the straddle yoke and imparts initial returning movement thereto.

As the shaft 20 is further rotated, the crank arm 116 moves the link 117 to the right, as viewed in Figs. 10 and 11, until the action of the spring 122 forces the notch 121 into engagement with the pin 120. At this point the pedal 100 is fully depressed, with the crank member 102 (Fig. 5) abutting stop 103, and the parts 73, 12, 60, and 117 are in the positions shown in Fig. 11, and will remain in those positions until the pedal 100 is released.

When the pedal 100 is released, the reverse rotation imparted to shaft 20 by the action of plunger spring 104 causes the crank arm 116 to move the link 117 to the left, as viewed in Figs. 11 and 12, imparting a return or clockwise movement to the yoke 60 and driving arm 55.

As the yoke and driving arm approach their full returned or original striking positions, a releasing pin 125 secured in the slot 119 engages the upper edge of the widened portion 118 of link 117, to disengage pin 120 from notch 121, as shown in Fig. 12, and release the link 117 from driving engagement with straddle yoke 60. As the pedal 100 reaches its upper limit of movement, with the collar 105 abutting the plunger rod bearing 25, the back stop surface 71 abuts with end wall 70 of arm slot 26, and the mass of the counterweight flanges 63 and 64 exerts a toggle action upon the gripping and driving arm 55 to bring the end 59 into driving engagement with a serrated surface of clutch wheel 50, so that the parts are positioned for the next impact to be imparted to the ball 12.

Means for locking the cam and lever releasing means operated by the release pedal 100, for maintaining the practice ball 12 in partially returned position after a predetermined number of impacts or strokes, preferably includes the pawl link 128 pivotally connected at one end to the crank member 102 and extending therefrom over the lock and release shaft 21, the other end of the link being provided with a cam portion 129 adapted to ride on the cam 130 fixed on the shaft 21, for a purpose to be hereinafter described.

The end 131 of the pawl link 128 is adapted to successively engage the ratchet teeth 132 of the ratchet wheel 133, which is rotatably mounted on a stud 134 secured to cross member 36' of the frame, so that as the link 128 is moved to the right, as viewed in Fig. 5, by depression of the release pedal 100, the ratchet wheel 133 will be rotated clockwise a predetermined distance.

Preferably, a disk 135 is fixed to the ratchet wheel 133 for rotation therewith, and the disk is provided with a notch 136 in its periphery. The tooth engaging end 131 of the link 128 is provided with a lateral projection or finger 137 (best shown in Fig. 9) extending laterally from the link and adapted for engaging the notch 136 when the ratchet wheel has been rotated a predetermined distance by a predetermined number of movements of the link 128.

A drag pawl 138 is pivotally mounted at its upper end on the cross member 36', as at 139, and the lower end thereof is urged toward the ratchet wheel 133 by a spring 140. The lower end of the drag pawl 138 is provided with a finger portion 141 adapted for engaging the upper surface of one of the ratchet teeth 132 at the end of each successive clockwise movement of the wheel as actuated by the pawl link 128, in the position shown in Fig. 8, to lock the wheel against counter-clockwise movement as the pawl link 128 is returned for engaging the next successive tooth.

Figure 8:
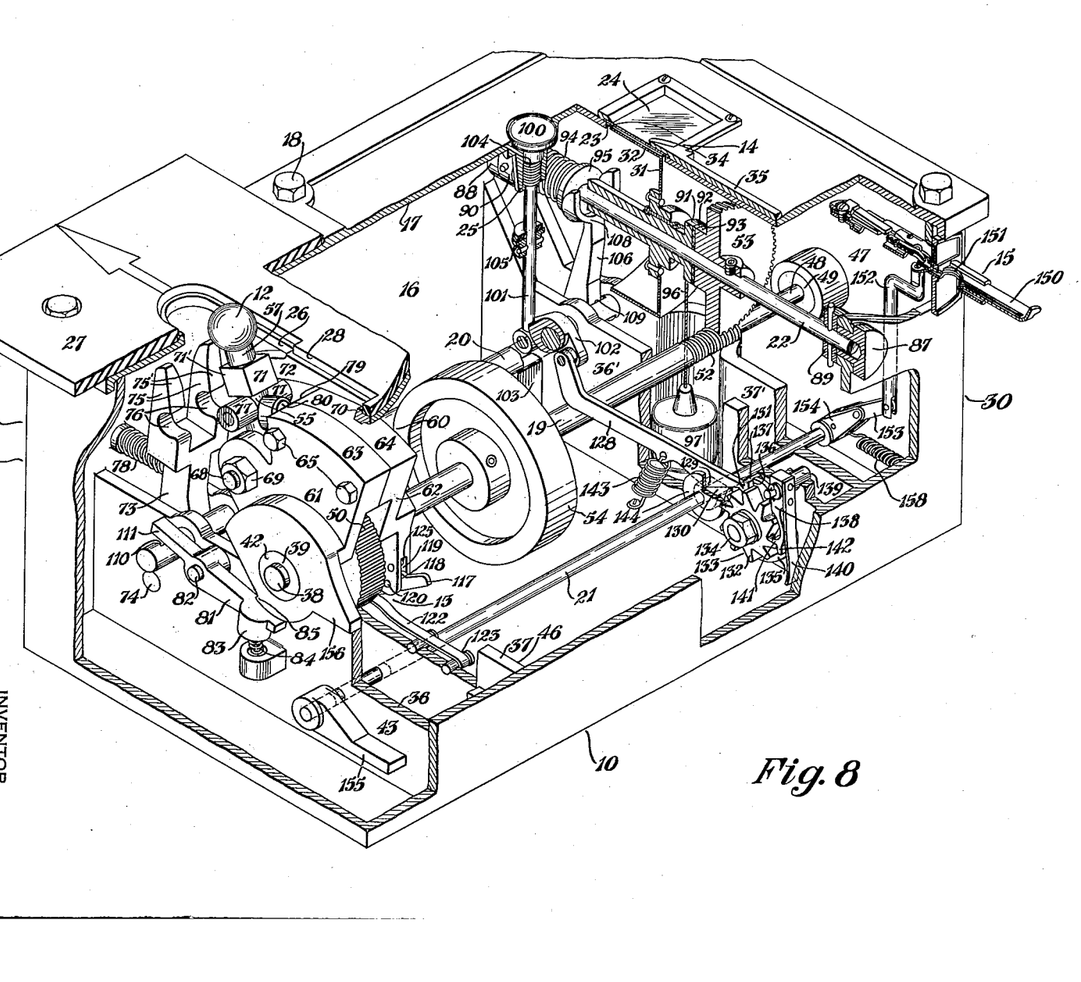
Fig. 8 is a similar perspective view showing the ball body held in partially returned position by the release locking means when the release pedal has been depressed after the last of a predetermined number of impact movements.

The lower end of drag pawl 138 is also provided with a finger portion 142, for engaging one of the ratchet teeth 132 when the finger 137 has dropped into notch 136, in the position shown in Fig. 8. When the finger is raised out of the notch, the spring 140 urges the finger 142 inward, rotating the ratchet wheel clockwise a slight distance and together with it the disk 135, to the positions shown in Fig. 9, so that the finger 137 cannot again drop into notch 136.

At the end of each upward movement of the pedal 100, the pawl link 128 has been moved to the left, as viewed in Fig. 5, in readiness to engage the next successive ratchet tooth, for rotating the ratchet wheel 133 another step when the pedal is again depressed. A spring 143 is connected at one end to the bottom of the frame and at its other end to an intermediate portion of link 128, for successively holding the end 131 in engagement with the successive ratchet teeth, and for causing the cam portion 129 to ride over cam 130.

Preferably, a washer 144 is secured to the shaft 21 adjacent to the cam 130 for laterally guiding the link 128 into engagement with the ratchet teeth and maintaining the link on the cam 130.

After the pawl link has moved the ratchet wheel clockwise a predetermined number of times equal to the number of ratchet teeth 132, which in this case is ten, the action of spring 143 pulls the finger 137 into the notch 136, as shown in Fig. 8, and since the drag pawl locks the ratchet wheel against counter-clockwise movement, the release pedal 100 is locked in fully depressed position.

The disk 135 may be provided with a plurality of notches 136 at intervals around its pheriphery, for locking the release pedal after a fewer number of movements, if desired.

As previously set forth, when the release pedal is in its fully depressed position, the driving arm 55 and ball 12 are maintained in the initial returning position of Fig. 8, with the pin 120 in engagement with the notch 121 of the resetting link 117, so that the ball cannot be returned for striking in any way until the release pedal locking means is unlocked.

Coin controlled operation control means for unlocking the release pedal locking means for permitting another series of impact movements of the practice ball 12, may include a standard coin slot mechanism such as is commonly used in coin controlled machines, and indicated generally at 15.

When the coin slot mechanism is in inoperative position, the coin slide bar 150 may be forced inwardly only a limited amount, which is not sufficient to operate the unlocking means inside the box-like frame.

By placing a coin of the proper denomination in slot 151 of slide bar 150, the bar may be given its full inward movement to drop the coin within the frame, in the usual manner, and operate the unlocking means.

The unlocking means preferably includes an operating rod 152 secured at its upper end to the coin slide bar 150 and depending downwardly therefrom. A link 153 is pivotally connected at one end to the lower end of rod 152, and pivotally connected at its other end to a lever arm 154 secured on the lock and release shaft 21.

Figure 9:
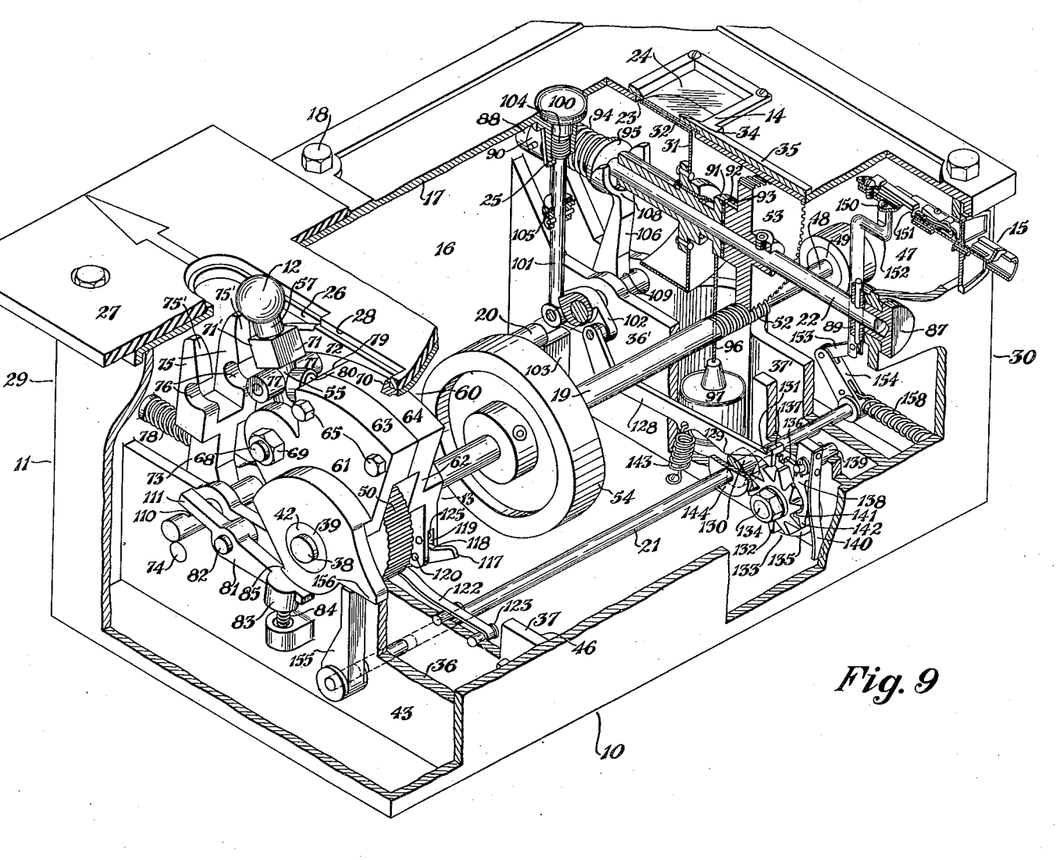
Fig. 9 is a similar perspective view showing the coin controlled means moved inwardly for unlocking the release locking means, whereby outward movement of the coin controlled means to normal position will permit the release means to return the ball body to normal position for another series of impact movements.

Full inward movement of the coin slide bar 150 will rotate the shaft 21 sufficiently to bring the cam 130 into engagement with cam portion 129 of link 128, and raise the finger 137 out of the notch 136. At this time the finger 142 advances the disk 135 to the position shown in Fig. 9, so that the notch 136 is out of register with finger 137. In this position of the slide bar 150, the shaft 21 has been rotated sufficiently to bring the yoke locking arm 155, secured on the end of the shaft 21 at the striking end of the apparatus, into abutment with the tooth 156 projecting from the side member 61 of straddle yoke 60, as shown in Fig. 9. Thus with the coin slide bar held in full inward position, the ball 12 cannot be returned to striking position.

Since the link 117 is at this time in driving engagement with the yoke 60, the release pedal 100 cannot move upward until the ball returns to striking position, so that the coin slot mechanism must be returned to normal inoperative position to permit the release pedal to move upwardly and return the ball to striking position.

Preferably, a spring 158 is connected at one end to the front wall of the frame and at its other end to the lever arm 154 for returning the coin slide bar 150 to normal position when inward pressure on the slide bar is removed. The returning movement of the slide bar rotates the shaft 21 to release the stop arm 155 from abutment with tooth 156, whereupon the spring 104 moves the plunger 100 to its upper position rotating shaft 20 to return the ball 12 to striking position, in the manner previously described. At the same time the cam 130 on shaft 21 rotates, permitting spring 143 to pull the pawl link end 131 into ratchet tooth actuating position, and the link end 131 moves to the left, as viewed in Fig. 5, over the next successive ratchet tooth 132 in position to actuate the same during the next downward movement of pedal 100.

Figure 6:
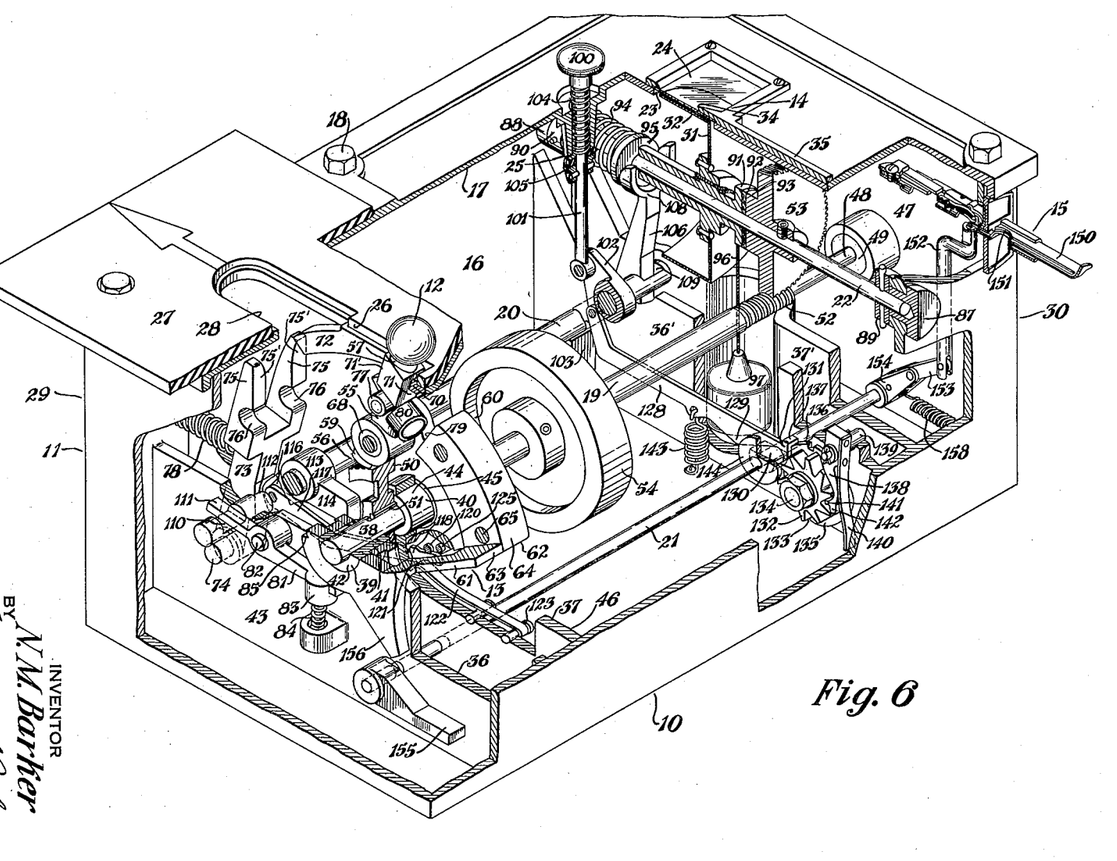
Fig. 6 is a perspective view of the improved apparatus with the ball body in striking position, parts being broken away and parts in section, the coin controlled operation control means having been actuated to permit the first of a series of impact movements of the ball body.

The parts are now in the positions shown in Fig. 6, ready for another series of impacts to be imparted to the ball 12, and after the last impact of the series, when the release pedal is depressed the finger 137 again drops into notch 136, and locks the release pedal in depressed position.

In the operation of the apparatus, assuming the parts to be in the inoperative positions of Fig. 8, the player inserts a coin in the slot 151 and presses the coin slide bar inwardly as far as possible to drop the coin, and move the parts to the positions of Fig. 9; and then releases the slide bar to permit it to return to normal position, returning the ball 12 to striking position, and the release pedal to its upper position, all as shown in Fig. 6, at the same time returning the indicator drum 31 to the zero position shown in Fig. 1.

The ball is then struck with the head of a golf club, the parts assuming the positions of Fig. 7, and the yardage corresponding to the momentum of the impact observed upon the dial.

The release pedal 100 is then fully depressed and released to return the ball to striking position, and the ball again struck. This operation is repeated until the predetermined number of impact movements or strokes (in this case ten) has been completed, when, after another depression of the pedal, the finger 137 drops into notch 136 and again locks the parts in their positions of Fig. 8. By then inserting another coin, the cycle of operations may be repeated. After the tenth impact, the release pedal must be depressed before inserting a coin to start another series.

Since the indicating drum is calibrated to show horizontal free flight yardage proportionate to the momentum imparted by the impact given to the ball; if the ball is not correctly hit, this will be shown by the relatively small yardage on the indicator dial.

In other words, if the ball is struck above or below center, or the blow is not struck parallel to the impact movement of the ball, that is, parallel to the line of flight of a free flight ball, the resulting yardage indicated on the dial will be correspondingly diminished. Accordingly, a direct hit on the ball will show a maximum yardage on the dial proportionate to the force of the impact.

Since the practice ball 12 always returns to its exact starting position, the manner in which the club head met the ball may be determined by coating the ball with paint or the like before a stroke. After the coated ball has been struck and returned, the point of contact between the club head and ball may be observed, and also it may be seen whether the club has met the ball parallel to the line of flight or was drawn across the face of the ball in striking it.

Thus a player may improve his ability by practicing indoors or in utmost privacy, without having to use the facilities of a practice range, with the attendant requirements of caddies, fees, and the like; and the apparatus is therefore particularly adapted for use by golf instructors.

The present improved apparatus tends to break the inherent habit of raising the eyes to follow the flight of the ball, because there is no such ball to watch, and because the indicator dial is positioned below the eyes adjacent to the position of the ball before being struck.

Moreover, the release pedal may be operated between strokes by the foot of the player, so that returning the practice ball to striking position does not require removal of the hands from the club, and interferes only very slightly with the timing of the stroke and the stance of the player.

And finally, the improved apparatus may be installed for use in recreation resorts, golf clubs, and at other desirable locations without requiring the presence of an attendant, because the apparatus is not capable of operation without inserting a coin, check or token before every series of strokes of a predetermined number.

I claim:

1. Momentum measuring apparatus including a body adapted for having momentums imparted thereto, a member rotatable about an axis, momentum measuring means including a drive shaft rotatable about the same axis, and a gripping lever member, the body being mounted adjacent the outer end of the lever, and means pivotally mounting the lever on the rotatable member for alternate movements between positions of gripping engagements and disengagements of the inner end of the lever with the shaft, whereby momentums of the body and the gripping member are successively directly transmitted to the momentum measuring means.

2. Momentum measuring apparatus including a body adapted for having momentums imparted thereto, a member rotatable about an axis, momentum measuring means including a drive shaft rotatable about the same axis, and a gripping lever member, the body being mounted adjacent the outer end of the lever, and means pivotally mounting the lever on the rotatable member for alternate movements between positions of gripping engagements and disengagements of the inner end of the lever with the shaft, whereby momentums of the body and the gripping member are successively directly transmitted to the momentum measuring means, and indicating means operatively associated with the momentum measuring means for successively indicating the magnitude of the momentums directly transmitted to the momentum measuring means from the body.

3. Momentum measuring apparatus including a body adapted for having momentums imparted thereto, a member rotatable about an axis, momentum measuring means including a drive shaft independently journalled for rotation independently of the rotatable member about the same axis, and a gripping lever member, the body being mounted adjacent the outer end of the lever, and means pivotally mounting the lever on the rotatable member for alternate movements between positions of gripping engagements and disengagements of the inner end of the lever with the shaft, whereby momentums of the body and the gripping member are successively directly transmitted to the momentum measuring means.

4. Momentum measuring apparatus including a body adapted for having momentums imparted thereto, a member rotatable about an axis, momentum measuring means including a drive shaft rotatable about the same axis, and a gripping lever member, the body being mounted adjacent the outer end of the lever, and means pivotally mounting the lever on the rotatable member for alternate movements between positions of gripping engagements and disengagements of the inner end of the lever with the shaft, whereby momentums of the body and the gripping member are successively directly transmitted to the momentum measuring means, and means limiting the movement of the rotatable member and absorbing the momentum thereof and of the body mounted thereon.

5. Momentum measuring apparatus including a body adapted for having momentums imparted thereto, a member rotatable about an axis, momentum measuring means including a drive shaft independently journalled for rotation independently of the rotatable member about the same axis, and a gripping lever member, the body being mounted adjacent the outer end of the lever, and means pivotally mounting the lever on the rotatable member for alternate movements between positions of gripping engagements and disengagements of the inner end of the lever with the shaft, whereby momentums of the body and the gripping member are successively directly transmitted to the momentum measuring means, and means limiting the movement of the rotatable member and frictionally absorbing the momentum thereof and of the body mounted thereon at an increasing rate of frictional resistance.

6. In momentum measuring apparatus and the like, a shaft journalled for rotation about its longitudinal axis, a frame rotatably mounted for rotation about the same axis, a lever arm, means pivotally mounting the lever arm intermediate its ends on the frame, the outer end of the arm being adapted for having momentums imparted thereto, a wheel secured to the shaft, the periphery of the wheel being located between the axis and the pivotal mounting means of the arm, and the inner end of the arm being adapted for successive gripping engagements and disengagements with the periphery of the wheel, whereby momentums of the arm are successively transmitted to the shaft.

7. Momentum measuring apparatus including a shaft journalled for rotation about its longitudinal axis, a frame rotatably mounted for rotation about the same axis, a lever arm, means pivotally mounting the lever arm intermediate its ends on the frame, the outer end of the arm being adapted for having momentums imparted thereto, a wheel secured to the shaft, the periphery of the wheel being located between the axis and the pivotal mounting means of the arm, and the inner end of the arm being adapted for successive gripping engagements and disengagements with the periphery of the wheel, whereby momentums of the arm are successively transmitted to the shaft, and means applying a definite resistance against rotation of the shaft, and releasable anti-recoil means limiting movement in one direction of the arm and releasably locking the arm at a predetermined position.

8. Momentum measuring apparatus including a shaft journalled for rotation about its longitudinal axis, a frame rotatably mounted for rotation about the same axis, a lever arm, means pivotally mounting the lever arm intermediate its ends on the frame, the outer end of the arm being adapted for having momentums imparted thereto, a wheel secured to the shaft, the periphery of the wheel being located between the axis and the pivotal mounting means of the arm, and the inner end of the arm being adapted for successive gripping engagements and disengagements with the periphery of the wheel, whereby momentums of the arm are successively transmitted to the shaft, and means operatively associated with the shaft for measuring and indicating the momentums transmitted thereto, and means limiting movement in one direction of the arm and releasably locking the arm at a predetermined position, and means releasably locking the frame after rotation thereof in one direction to a predetermined position.

9. Momentum measuring apparatus including a shaft journalled for rotation about its longitudinal axis, a frame rotatably mounted for rotation about the same axis, a lever arm, means pivotally mounting the lever arm intermediate its ends on the frame, the outer end of the arm being adapted for having momentums imparted thereto, a wheel secured to the shaft, the periphery of the wheel being located between the axis and the pivotal mounting means of the arm, and the inner end of the arm being adapted for successive gripping engagements and disengagements with the periphery of the wheel, whereby momentums of the arm are successively transmitted to the shaft, and means operatively associated with the shaft for measuring and indicating the momentums transmitted thereto, and releasable anti-recoil means releasably locking the frame after rotation thereof in one direction to a predetermined position, and means for releasing the anti-recoil means and reversely rotating the frame to another predetermined position.

10. Momentum measuring apparatus including a shaft journalled for rotation about its longitudinal axis, a frame rotatably mounted for rotation about the same axis, a lever arm, means pivotally mounting the lever arm intermediate its ends on the frame, the outer end of the arm being adapted for having momentums imparted thereto, a wheel secured to the shaft, the periphery of the wheel being located between the axis and the pivotal mounting means of the arm, and the inner end of the arm being adapted for successive gripping engagements and disengagements with the periphery of the wheel, whereby momentums of the arm are successively transmitted to the shaft, and means operatively associated with the shaft for measuring and indicating the momentums transmitted thereto, and releasable anti-recoil means releasably locking the frame after rotation thereof in one direction from an initial position to a second position, and the measuring and indicating means including a drum having an initial position corresponding to the initial position of the frame, releasable means connecting the drum with the shaft, and means operative to return the drum to its initial position after release thereof from operative connection with the shaft, and means for releasing the anti-recoil means and reversely rotating the frame to the initial position and releasing the drum from operative connection with the shaft.

11. Momentum measuring apparatus including a shaft journalled for rotation about its longitudinal axis, a frame rotatably mounted for rotation about the same axis, a lever arm, means pivotally mounting the lever arm intermediate its ends on the frame, the outer end of the arm being adapted for having momentums imparted thereto, a wheel secured to the shaft, the periphery of the wheel being located between the axis and the pivotal mounting means of the arm, and the inner end of the arm being adapted for successive gripping engagements and disengagements with the periphery of the wheel, whereby momentums of the arm are successively transmitted to the shaft, and means operatively associated with the shaft for measuring and indicating the momentums transmitted thereto, and releasable anti-recoil means releasably locking the frame after rotation thereof in one direction to a predetermined position, and means for releasing the anti-recoil means and reversely rotating the frame to another predetermined position, and releasable control means for the release means rendering the release means inoperative after a plurality of operations thereof.

12. Momentum measuring apparatus including a shaft journalled for rotation about its longitudinal axis, a frame rotatably mounted for rotation about the same axis, a lever arm, means pivotally mounting the lever arm intermediate its ends on the frame, the outer end of the arm being adapted for having momentums imparted thereto, a wheel secured to the shaft, the periphery of the wheel being located between the axis and the pivotal mounting means of the arm, and the inner end of the arm being adapted for successive gripping engagements and disengagements with the periphery of the wheel, whereby momentums of the arm are successively transmitted to the shaft, and means operatively associated with the shaft for measuring and indicating the momentums transmitted thereto, and releasable anti-recoil means releasably locking the frame after rotation thereof in one direction to a predetermined position, and means for releasing the anti-recoil means and reversely rotating the frame to another predetermined position, and releasable control means for the release means rendering the release means inoperative after a plurality of operations thereof, and means for operating the releasable control means to render the release means operative.

NORMAN M. BARKER.